US010087502B2

(12) United States Patent
Grogan et al.

(10) Patent No.: US 10,087,502 B2
(45) Date of Patent: Oct. 2, 2018

(54) DECOATING OF COATED MATERIALS

(71) Applicant: COLORADO SCHOOL OF MINES, Golden, CO (US)

(72) Inventors: Joseph Grogan, Lakewood, CO (US); Corby G. Anderson, Golden, CO (US); Gerard P. Martins, Golden, CO (US)

(73) Assignee: COLORADO SCHOOL OF MINES, Golden, CO (US)

(*) Notice: Subject to any disclaimer, the term of this patent is extended or adjusted under 35 U.S.C. 154(b) by 90 days.

(21) Appl. No.: 14/631,527

(22) Filed: Feb. 25, 2015

(65) Prior Publication Data

US 2015/0259766 A1 Sep. 17, 2015

Related U.S. Application Data

(60) Provisional application No. 61/944,459, filed on Feb. 25, 2014.

(51) Int. Cl.
| | |
|---|---|
| *C22B 7/00* | (2006.01) |
| *C25F 5/00* | (2006.01) |
| *B01D 61/24* | (2006.01) |
| *C22B 3/00* | (2006.01) |
| *C23F 1/30* | (2006.01) |
| *C23F 1/44* | (2006.01) |

(52) U.S. Cl.
CPC ............ *C22B 19/22* (2013.01); *B01D 61/243* (2013.01); *C22B 7/007* (2013.01); *C22B 19/26* (2013.01); *C23F 1/30* (2013.01); *C23F 1/44* (2013.01); *C25F 5/00* (2013.01); *Y02P 10/234* (2015.11)

(58) Field of Classification Search
CPC .......... B01D 61/243; C25F 5/00; C22B 7/007
See application file for complete search history.

(56) References Cited

U.S. PATENT DOCUMENTS

| | | | | |
|---|---|---|---|---|
| 5,264,123 | A * | 11/1993 | Bailey ................. | B01D 61/243 |
| | | | | 210/321.75 |
| 5,302,260 | A * | 4/1994 | LeRoy ..................... | C25F 5/00 |
| | | | | 205/604 |
| 2006/0191799 | A1* | 8/2006 | Strezov ................ | C22B 34/129 |
| | | | | 205/367 |
| 2011/0083972 | A1* | 4/2011 | Ojebuoboh .............. | C25F 5/00 |
| | | | | 205/674 |

OTHER PUBLICATIONS

Xhoffer, C. et al. "Quantitative Phase Analysis of Galvannealed Coatings by Coulometric Stripping." Journal of Applied Electrochemistry. vol. 29. pp. 209-219. 1999.*

(Continued)

*Primary Examiner* — George Wyszomierski
*Assistant Examiner* — Tima M McGuthry Banks
(74) *Attorney, Agent, or Firm* — Dorsey & Whitney LLP

(57) ABSTRACT

A system and method for decoating a scrap coated metal in a leach solution uses direct measuring of the corrosion potential of the scrap metal in the system to determine the progress of the decoating process and end the process when the scrap is decoated. Corrosion potential measurements are made using a working electrode comprising more than one piece of scrap coated-metal within the system. The decoating system and method may include a system for recycling leach solution.

9 Claims, 11 Drawing Sheets

(56) References Cited

OTHER PUBLICATIONS

Atkas et al., Recovery of Zinc From Galvanized Scraps. Turkish Journal of Engineering and Environmental Sciences. Aug. 22, 2002;26(5):395-402.
Dudek et al., Progress in Caustic Dezincing of Galvanized Scrap, to be presented at the Gorham/InterTech International Iron & Steel Industry Conference, Steel Mill Wastes and By-Products, Toronto, Ontario, Jun. 2-4, 1997, pp. 1-12.
Franzen et al., Removal of Zinc Layers From Coated Steel Strip by Thermal and Mechanical Processing, Steel Research 70 (1999) No. 4+5, pp. 141-146.
Fujio et al., Removal of Zinc by Baking of Automotive Body Scrap, 1992 Steelmaking Conference Proceedings, 1992, pp. 749-756.
Groult et al., Dezincing of Zinc Coated Steel Scrap: Current Situation at Saint-Saulve Dezincing Plant of Compagnie Europeenne De Dezingage (C.E.D.), Recycling of Metals and Engineered Materials, The Minerals, Metals & Materials Society, 2000, pp. 201-209.
Hegewaldt, Recycling of Zinc-Coated Steel Sheets, International Scientific Colloquium, Modelling for Saving Resources, Riga, May 17-18, 2001, pp. 164-168.
Hegewaldt, The Role of Zinc in the Recycling of Steel Scrap; Ecology, Electrotechnology and Waste Processing, KORUS'99, 1999, pp. 420-424.
Hodl et al., The Future of Dezincing Plants—Why? What? When?, AISTech 2011 Proceedings—vol. I, 2011, pp. 161-166.
Houlachi et al., Quality Issues in the Recycle of Zinc From Steel Scrap, 1992 Steelmaking Conference Proceedings, 1992, pp. 757-764.
Jiricny et al., Spouted Bed Electrowinning in the Recovery of Zinc From Scrap Galvanized Steel, Dept. of Materials Science and Mineral Engineering, University of California, 1998, pp. 411-426.
Koros et al., Zinc and Steel Scrap-Continued Recyclability and Zinc Recovery, 1993 International Zinc Conference, 1993, section 7, pp. 1-18.
Koros, Dusts, Scale, Slags, Sludges . . . Not Wastes, But Sources of Profits, Metallurgical and Materials Transactions B, vol. 34B, Dec. 2003, pp. 769-779.
Niedringhaus et al., A Technical Evaluation of Dezincification of Galvanized Steel Scrap, 1992 Steelmaking Conference Proceedings, 1992, pp. 725-741.
Palaty et al., Continuous Dialysis of Sulphuric Acid in the Presence of Zinc Sulphate, Chemical Papers 65 (2) 233-241 (2011).
Pflaum, The Scrap Industry's Perspective on Recycling Coated Scrap, 1992 Steelmaking Conference Proceedings, 1992, pp. 713-715.
Prado et al., Dezincing Galvanized Steel Using a Noncorrosive Low Energy Hydrometalurgical System, The Minerals, Metals & Materials Society, 1991, pp. 1337-1344.
Rome, A Contribution to the Recycling of Coated Steels, The Results of a Consultation of Experts, 1992 Steelmaking Conference Proceedings, 1992, pp. 687-692.
Schneider et al., Some Aspects Concerning the Recycling of Metallic Coated Steel, 1992 Steelmaking Conference Proceedings, 1992, pp. 693-704.
Schonfelder et al., Dezincification of Steel Scrap, Chemical Engineering & Technology, 2012, 84, No. 10, pp. 1749-1756.
Solimani et al., Dezincing Galvanized Coated Steel Scrap Using Sulfuric Acid, Waste Processing and Recycling in Mineral and Metallurgical Industries—VI, 2011, pp. 115-125.
Tee et al., Recycling of Galvanized Steel Scrap Using Chlorination, Department of Materials Science and Metallurgy, University of Cambridge, Edited by B. Mishra, The Minerals, Metals & Materials Society, 1999, pp. 883-891.
Van Rij et al., Dezincing of Steel Scrap, Iron and Steel Engineer, Apr. 1997, pp. 32-34.

\* cited by examiner

DECOATING OF COATED MATERIALS

CROSS REFERENCE TO RELATED APPLICATIONS

This application claims benefit of priority pursuant to 35 U.S.C. § 119(e) of U.S. provisional patent application No. 61/944,459, filed Feb. 25, 2014, which is hereby incorporated herein by reference in its entirety.

FIELD

The disclosed processes, methods, and systems are directed to treating coated metals and the separate recovery of a metals stream and a coatings stream.

BACKGROUND

Many metals receive a coating as a way of increasing their functionality. For example, galvanization is the process of coating steel or iron with a zinc coating, which aids in protecting the substrate metal. This process provides the underlying metal with a protective, corrosion resistant layer of zinc. Galvanization may be performed by electroplating. (electrogalvanization) or hot-dipping with the option for heat treating the coating after deposition.

Scrap coated metals are currently a lower value scrap. This is because the coating may interfere with recycling processes or may be emitted as a toxic or hazardous substance. For example, furnaces that process scrap galvanized metal may emit zinc in the flue gas. Some of this zinc bearing waste may be recycled but generally only to mitigate waste disposal costs. The United States Environmental Protection Agency (USEPA) regulates the levels of elements that follow zinc, such as cadmium, in emissions and discharges.

To avoid unnecessary levels of toxic or hazardous emissions, it is sometimes beneficial to remove coatings from metal. In the case of zinc decoating, this can be done through a variety of methods including hydrometallurgical, pyrometallurgical, and mechanical processes.

SUMMARY

Disclosed herein is a method for decoating coated metals comprising: placing a scrap metal with a coating layer in an electrically conductive cage; immersing the coated scrap in an acidic leach solution in a reaction vessel; allowing the coating layer to react with the leach solution and dissolve into the leach solution; placing a reference electrode in the leach solution; measuring a corrosion potential by connecting the conductive cage to a volt meter and the reference electrode to the volt meter; removing a volume of leach solution from the reaction vessel containing dissolved coating material; dialyzing the volume of leach solution removed from the reaction vessel against a low ionic strength strip solution; allowing an acid to enter the strip solution; adding a volume of the strip solution containing the acid to the reaction vessel; stopping the reaction when the measured potential plateaus; thereby decoating a coated metal. In many embodiments, the coating is zinc, the metal is steel, and the acid is sulfuric acid.

Also disclosed is a system for decoating coated metals comprising: a reaction vessel, comprising a tank with a plurality of inlets and outlets; the tank in fluid communication with a reagent recovery unit, wherein the reagent recovery unit comprises an ionic dialysis membrane; a volt meter; a reference electrode; and a lead for a working electrode. In some embodiments, the metal comprises steel or iron and the coating comprises zinc. The reference electrode for use in the disclosed system may be an Ag/AgCl electrode, and the working electrode may comprise a conductive containment cage of corrosion resistant metal, wherein the containment cage can be in electrical communication with a scrap metal positioned within the cage.

This Summary is provided to introduce a selection of concepts in a simplified form. It is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Figure 1A:
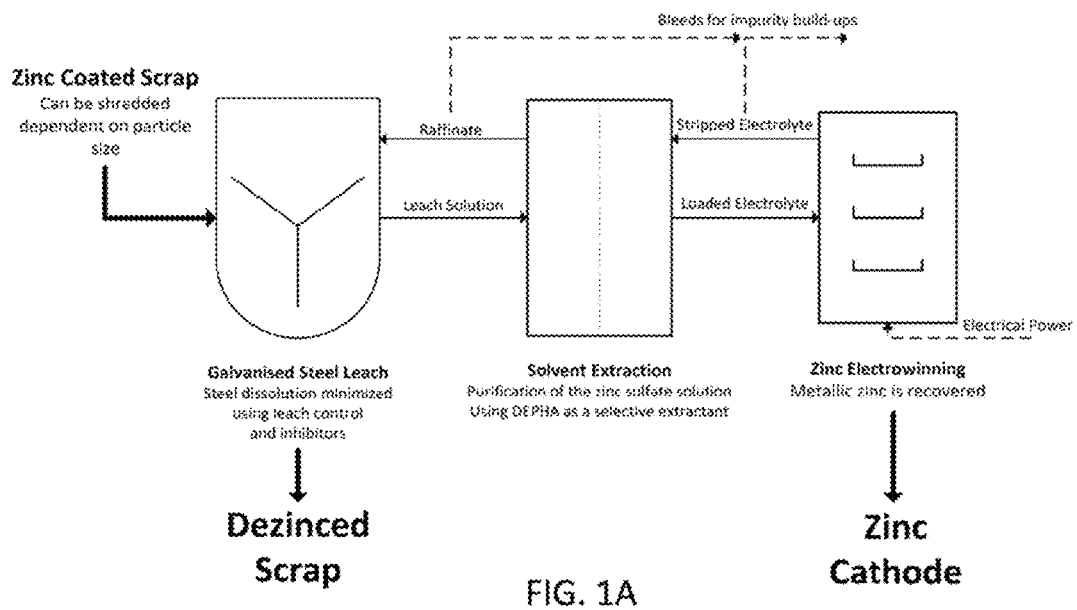
FIG. 1A is a flow diagram describing one embodiment of the de-zincing process, where zinc fertilizer is produced.

The disclosed compositions, devices, methods, processes, and systems are directed to enhancing removal of a coating material from coated metals and producing product streams containing de-coated metal and purified coating material as well as other useful products.

In one embodiment, a system for de-zincing galvanized metal is described. The system comprising a reaction vessel, a reagent recovery unit, and a product recovery station. Also disclosed are methods for removing coating materials from coated metals using a de-coating process, wherein decoating occurs in the reaction vessel and the progress of the process is monitored to prevent or reduce corrosion of the substrate metal. The decoating process may be run as a batch or continuous process. The disclosed process includes immersing a coated metal in a leach solution that dissolves the coating material. The disclosed process is monitored directly by measuring a corrosion potential, also called mixed potential, of the coated metal which aids in determining when the process is at or near completion. In many embodiments, the disclosed process can result in preparing beneficial product streams, for example recovered coating material constituents, decoated substrate metals, & hydrogen gas.

The disclosed methods and systems may be used to reduce the costs involved in decoating of coated metals. In one embodiment, the leach solution may be recycled by removing one or more reagents from the solution. Methods and systems described herein aid in maximizing decoating rates, while minimizing over-all processing time and reducing contamination of the product streams by impurities in the substrate metal. In some embodiments, waste energy (in the form of waste heat from other industrial processes, for example smelting, roasting, melting or refining) may be used, either directly or indirectly, to recover product streams.

Scrap Metal

Various coated metals can be decoated using the disclosed processes and systems. In one embodiment the coated scrap metal is a zinc coated steel. Other zinc coated substrate metals may also be used, for example iron and aluminum. Coatings other than zinc are also able to be removed using the disclosed process, such as nickel, chromium, cobalt, titanium, cadmium, magnesium, tin, iron and their alloys.

Scrap coated metal may be obtained from pre and/or post-consumer streams. For example, zinc coated metal may be recycled from used structures and devices. In one embodiment, coated metal may be obtained from the auto-recycling or auto-manufacturing industry, as well as any industry that is involved in the salvage of coated metal. In some embodiments, the industry produces as excess coated metal, for example coated metal removed during cutting, stamping, or forming of a coated metal component, and/or from rejected or surplus coated metal products.

Coated metal may be fully or partially coated with a coating material. In the case of zinc-coated steel, the scrap may be a fully-coated dipped metal or a stamped metal having non-coated edges/sides. The thickness of the coating layer and substrate material may vary.

Scrap metal can be shredded or otherwise treated prior to processing. In some cases, the scrap can be shredded such that the average area of coated surface per piece of scrap is less than about 50.0 square inch, 40.0 sq·in., 30.0 sq·in., 25.0 sq·in., 20.0 sq·in., 15.0 sq·in., 10.0 sq·in., 9.0 sq·in., 8.0 sq·in., 7.0 sq·in., 6.0 sq·in., 5.0 sq·in., 4.0 sq·in., 3.0 sq·in., 2.0 sq·in., 1.5 sq·in., 1.5 sq·in., 1.3 sq·in., 1.2 sq·in., 1.1 sq·in., 1.0 sq·in., 0.9 sq·in., 0.8 sq·in., 0.7 sq·in., 0.6 sq·in., 0.5 sq·in., and greater than about 0.4 sq·in., 0.5 sq·in., 0.6 sq·in., 0.7 sq·in., 0.8 sq·in., 0.9 sq·in., 1.0 sq·in., 1.1 sq·in., 1.2 sq·in., 1.3 sq·in., 1.4 sq·in., 1.5 sq·in., 2.0 sq·in., 3.0 sq·in., 40 sq·in., 5.0 sq·in., 10.0 sq·in., 20.0 sq·in., 30.0 sq·in., 40.0 sq·in., or 45.0 sq·in.

Depending upon the method used to galvanize a metal, the layer of zinc coating may be various thicknesses. For example, the thickness of a zinc coating layer may be from under 0.040 mm (1.7 mils) to over 0.09 mm (3.6 mils) or over 0.2 mm (7.9 mils). For most purposes, the amount of zinc in scrap zinc-coated metal is a fraction of the amount of metal. In most cases, zinc-coated metal scrap contains from about 1.0 to 0.6% zinc. In many cases, zinc-coated scrap metal comprises about 0.8 Wt. % zinc—that is 1000 kilograms of scrap zinc coated metal contains 8 kilograms of zinc.

Leach Solution

The leach solution used in the disclosed method may comprise any compound suitable to corrode the coating material. In most cases, the corrosive compound is an acid, for example sulfuric acid, $H_2SO_4$. Other inorganic acids, such as sulfurous acid, $H_2SO_3$, nitric acid, hydrochloric acid, phosphoric acid, and organic acids, such as ethanoic acid and acetic acid, may also be used.

The acid concentration in the leach solution is optimized and maintained, in order to provide a high rate of coating dissolution while minimizing the dissolution of the substrate metal. In the case of decoating of zinc-coated metals, the acid concentration is of a sufficient level to optimize zinc coating dissolution while minimizing the dissolution of the metal substrate, for example steel.

Free acid concentration in the leach solution is optimized to minimize the volume of leach solution. Keeping the volume of leach solution low helps to optimize downstream processing of the leach solution, such as removing the dissolved coating material and/or recycling of the free acid.

Free acid concentration is also optimized to maintain the concentrations of free acid and dissolved coating material below saturation levels in the leach solution. In the case of decoating zinc-coated metal scrap, this concentration is about 50 to 200 g $H_2SO_4$/L of leach solution, and the concentration of dissolved coating in the leach solution is about 50 to 200 g Zn/L.

DeCoating System

Figure 1B:
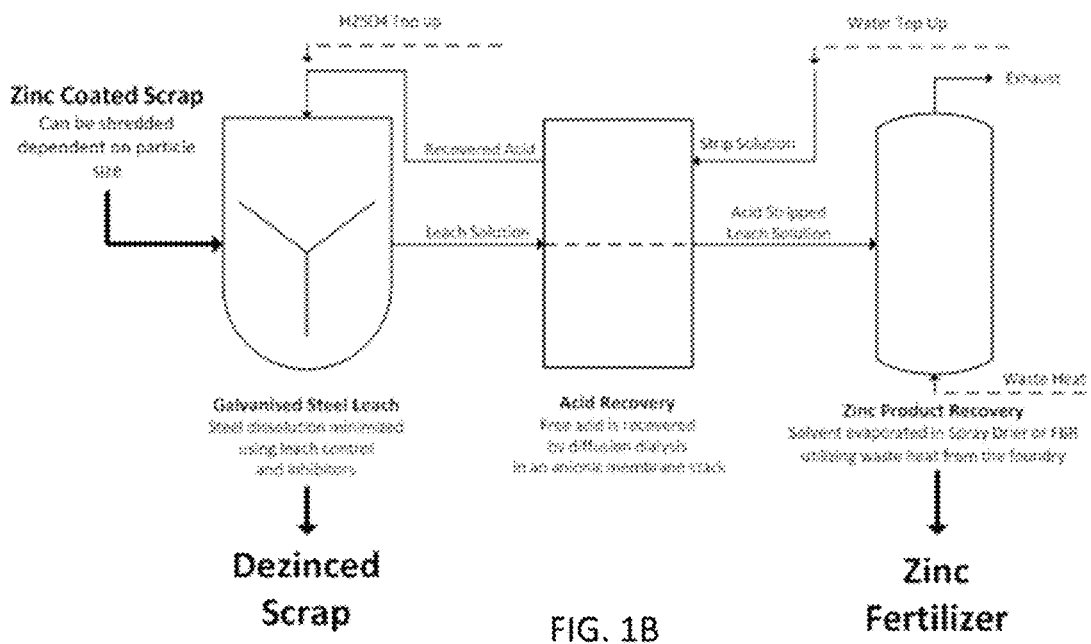
FIG. 1B is a flow diagram describing an embodiment similar to that shown in FIG. 1B, but this embodiment employs a Solvent Extraction step and a Zinc Electrowinning reactor to recover metallic zinc.
Figure 10:
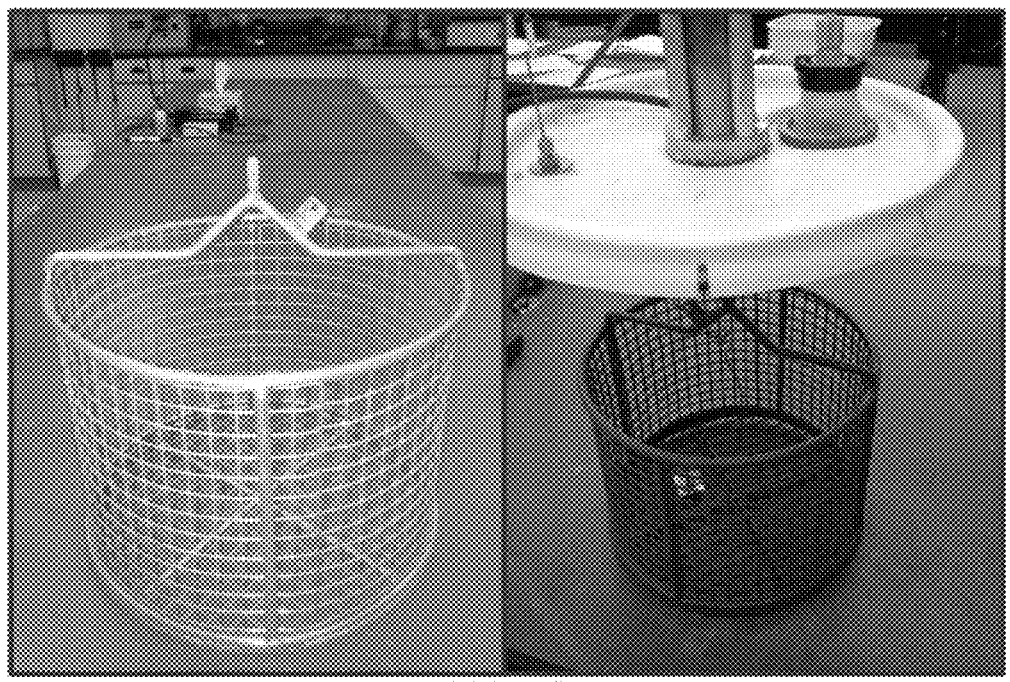
FIG. 10 presents two photos of basket used for bench scale leach: left) original SS316; right) ETFE Teflon coating over the SS on the basket.

FIG. 1A shows one embodiment of the disclosed system. This embodiment comprises galvanized scrap steel which moves into a leach tank. An aqueous acidic solution moves from the leach tank to an acid recovery reactor, followed by a zinc product recovery reactor; a reactor being a vessel in which a distinct chemical reaction takes place. The dotted lines above the various tanks show recovery and reconstitution of solutions from various stages. In addition, there is a water source for this recovery (labeled Water Top Up), which is combined with a strip solution from the Zinc Product Recovery reactor. Free Recovered Acid is recovered by diffusion dialysis in the Acid recovery reactor, using an anionic membrane stack. At the Zinc Product Recovery unit, heat (for example, waste from a foundry) may be used to obtain crystallized zinc, precipitated zinc, or otherwise to create a zinc product lacking significant levels of impurities such as iron. FIG. 1B is similar to 1A, but employs a Solvent Extraction step and a Zinc Electrowinning reactor to recover metallic zinc. FIG. 10 shows yet another embodiment of the disclosed system, and is discussed more below.

Figure 2:
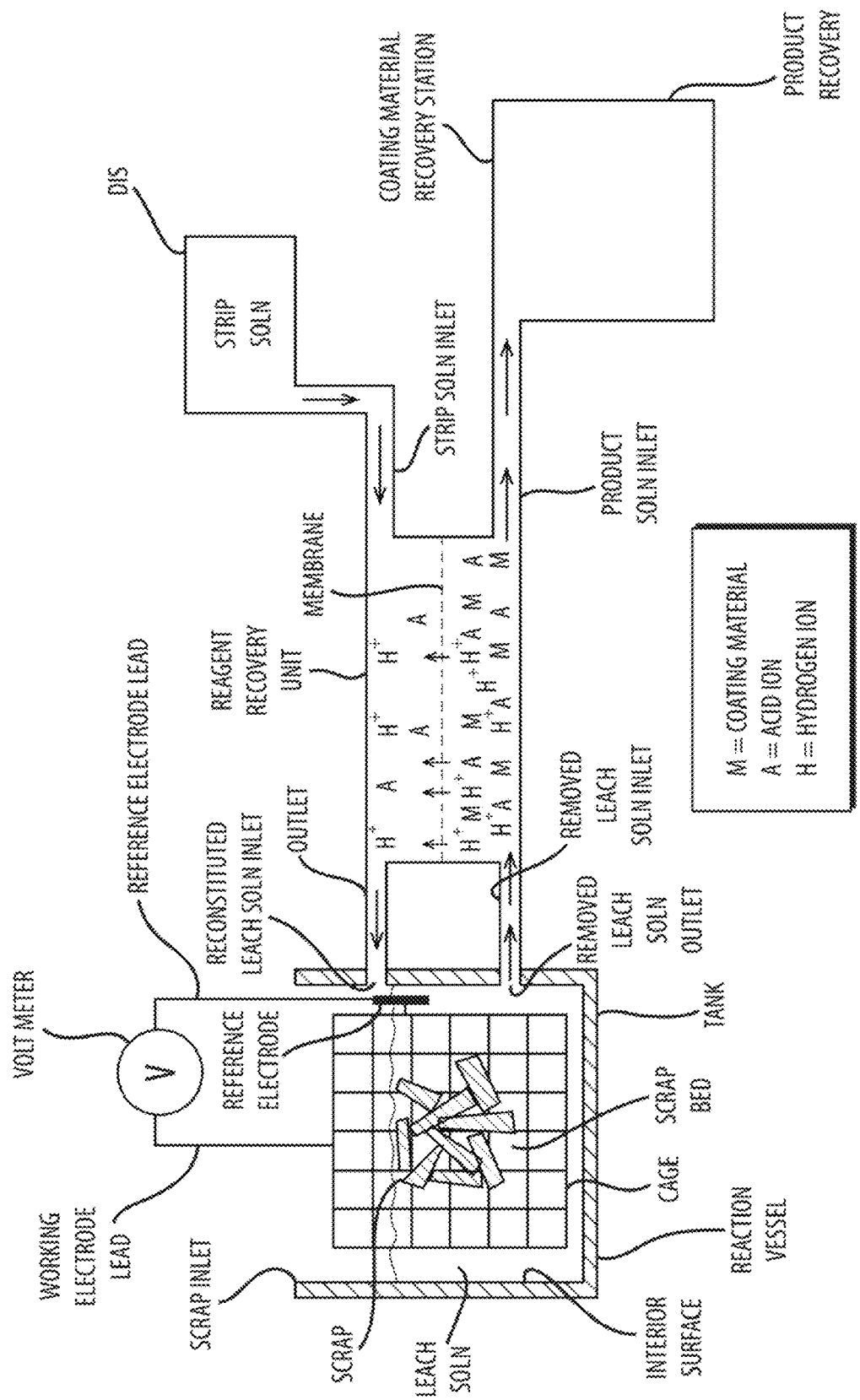
FIG. 2 is one embodiment of the disclosed process/system.

FIG. 2 is another embodiment of the disclosed system. As shown in FIG. 2, one embodiment of the disclosed system comprises a reaction vessel, a reagent recovery unit, and a product recovery unit. In the embodiment shown in FIG. 2, the reaction vessel is in fluid communication with the reagent recovery unit and the product recovery unit.

In the embodiment depicted in FIG. 2, the reaction vessel comprises a tank, a reference electrode, a lead for connection to a working electrode, a containment cage, and one or more inlets/outlets. The inlets/outlets allow for the removal or addition of reagents and/or products, for example coated scrap metal, decoated scrap metal, leach solution, acid, hydrogen gas, reconstituted leach solution. In some cases, the inlet/outlet may be configured to accept an electrode, for example a reference electrode or working electrode.

Tank

The tank has an interior surface that is corrosion resistant. In many embodiments, the interior surface of the tank is a material resistant to acid, such as plastic, glass, rubber, a fluorine based plastic, ethylene tetrafluoroethylene, ETFE, TEFLON®, or an acid resistant metal alloy such as nickel chromium steel alloys, or duplex steel. In some embodiments the interior surface is a coating that is chemical resistant and/or electrical resistant.

The tank is designed to accept the cage and allow the scrap metal within the cage to come into contact with the leach solution. Thus, in many embodiments the tank may be a tub with one or more inlet/outlet ports, for removing and/or adding materials to the tank. The tank may further include devices or structures that may aid in supporting, positioning, or moving the containment cage. The tank may have an inlet or opening configured to allow the containment cage to enter the interior of the tank. In some embodiments, the tank may be reversibly sealable and substantially airtight, such that gases can be captured.

Containment Cage

The containment cage is designed to accept and contain scrap metal. The cage aids in supporting an amount of scrap metal and may be positioned within the tank. When positioned in the cage, the scrap metal can be immersed in a solution in the tank. It can also be removed from the tank acting as the liquid/solid separation stage.

The containment cage is also designed to be in electrical communication with the scrap such that an electrical current/voltage may pass through the scrap and into the containment cage. The cage may be a mesh structure of various gauges and strengths suitable to support and contain the amount of scrap metal. In most embodiments, the containment cage is sufficiently strong, such that it may be used to transport the amount of coated scrap metal into the tank and remove the decoated scrap metal after the decoating process.

In some embodiments, the containment cage comprises an at least partially coated metal. In one embodiment, the coating is a chemical and/or electrical resistant coating. Inn some embodiments, the coating is a fluorine based plastic, for example ethylene tetrafluoroethylene, ETFE, or TEFLON®. Coated and uncoated cages may be electrically connected to a potentiometer for monitoring corrosion. In one embodiment the cage is connected to a Gamry potentiostat allowing for corrosion potential measurements. The image on the right in FIG. 10 shows a basket coated in Teflon, but where the SS304 spring electrical connection can be seen running down from the handle to a fastening on the floor of the basket as the basket now has an insulating coating.

The cage is constructed of a material that resists corrosion in the leach solution, or corrodes significantly slower than the coating material. The cage is configured to be in electrical communication with the working electrode (the scrap metal), and a volt meter, which may be positioned outside the tank and/or reaction vessel. Where the cage is at least partially comprised of a coated material, a working electrode and/or lead may be positioned within the cage so as to be in electrical communication with at least one piece of the scrap.

The containment cage is designed to support and contain the amount of scrap metal while the scrap is transported, mixed, tumbled, or agitated. In many cases, movement of the containment cage aids in re-distributing the scrap metal and/or scrap bed to allow all surfaces of the scrap metal to come into contact with the leach solution and/or containment cage.

The containment cage may be of any suitable shape and size. As shown in FIG. 2, the containment cage may define a square box-shape. In other embodiments, the containment cage may define a cylindrical shape that may aid in rotating the containment cage and tumbling the scrap placed inside the cage.

The containment cage can also take the shape of a continuous feed system with a tumbling, conveyor belt, and screw and trammel mechanism.

Electrodes/Volt Meter

The reaction vessel includes a reference electrode and a lead for connecting to the working electrode. The working electrode lead is designed to reversibly connect to the containment cage. The reference electrode is designed to be immersed in the leach solution within the tank, such that a circuit may be completed between the reference electrode, the leach solution, the working electrode, and the volt meter.

The working electrode is in electrical communication with the coated scrap/containment system. In some embodiments, the working electrode is a lead or spring positioned to be in electrical communication with at least one piece of scrap. In some embodiments, the working electrode is the coated scrap and/or the containment cage.

The reference electrode can be any suitable electrode, for example a leakless electrode. Use of a leakless electrode allows monitoring of the corrosion potential while minimizing corrosion of the reference electrode and introducing any contaminants from the reference electrode into the leaching solution. In some embodiments, the reference electrode is an Ag/AgCl electrode, calomel, copper/copper sulfate or other standard reference electrode.

The volt meter may be any meter suitable to measure the corrosion potential of the system. In many embodiments the volt meter may be a high impedance volt meter.

Reagent Recovery Unit

The reagent recovery unit may take the form of diffusion dialysis which includes an interior space, and at least one inlet/outlet in fluid communication with the interior space. In the embodiment depicted in FIG. 2, the diffusion dialysis reagent recovery unit includes a membrane, positioned within the interior space, a strip solution inlet, a reconstituted leach solution outlet, a removed leach solution inlet, and a product solution outlet. As shown in FIG. 2, the interior space of the reagent recovery unit may be in fluid communication with the interior of the tank through the reconstituted leach solution outlet, and the removed leach solution inlet. This reactor streams can operates in co-current or counter-current flows.

A pre-filtration step can be used on the bleed solution between the leach tanks and acid recovery reactor to remove any particulates.

A pre-ion exchange step can be used on the bleed solution between the leach tank and acid recovery reactor to remove any dissolved chemicals.

The reagent recovery unit may include a strip solution reservoir. The strip solution is in fluid communication with the interior space of the reagent recovery unit.

The product recovery unit is used to produce an end product comprising coating material. In some embodiments, the product recovery unit may include a fluidized bed reactor, a spray drier, or other comparable technologies.

Figure 1C:
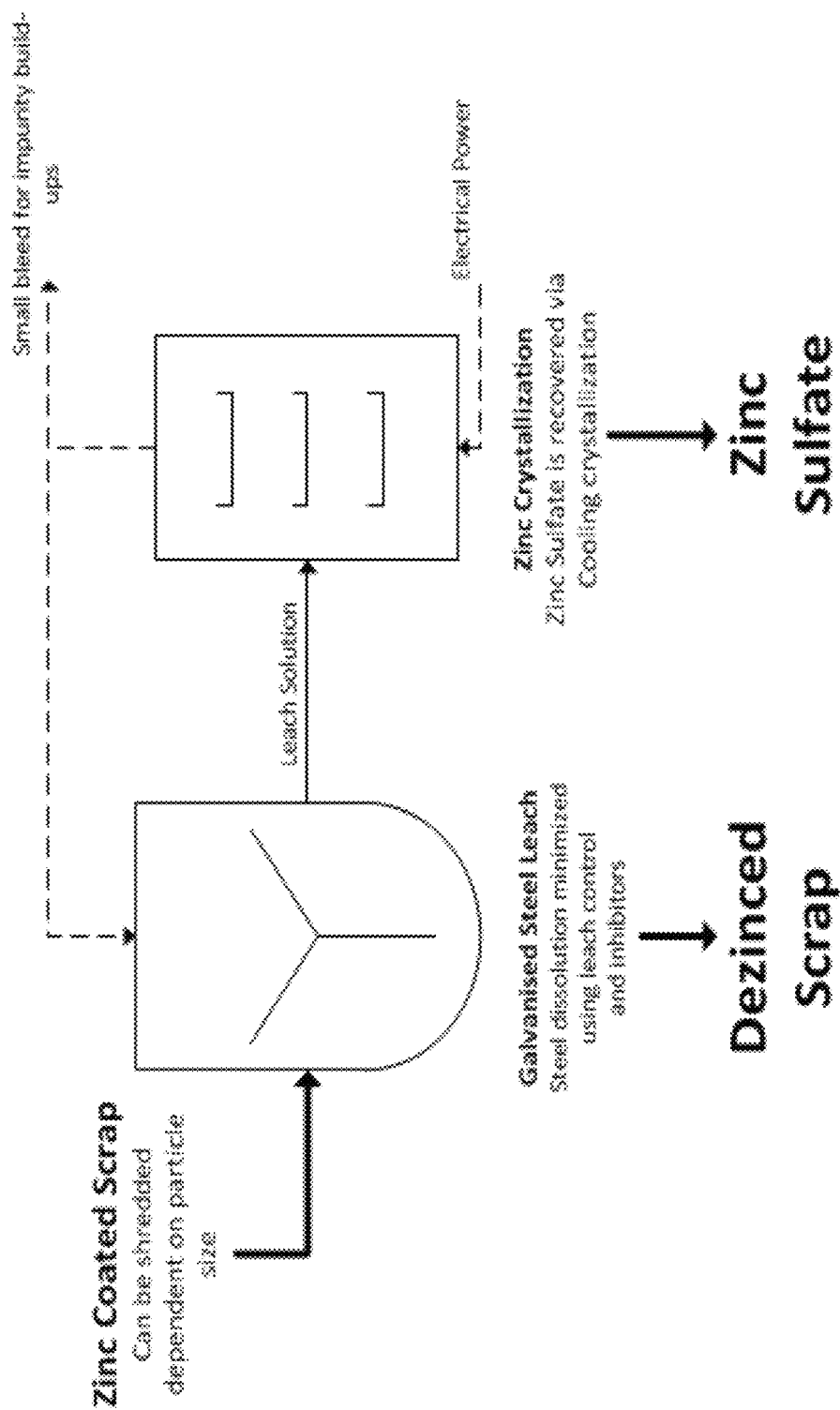
FIG. 1C is a flow diagram describing the use of zinc crystallization.

Reagent recovery could also take the form of the solution in a crystallization circuit. For example, as depicted in FIG. 1C, the zinc sulfate bleed would undergo crystallization which would remove zinc sulfate from solution, allowing the acid rich bleed, depleted in zinc sulfate, to be recycled and reused in the leach.

Coating Removal

The coating material may be removed by any suitable corrosive compound in the leach solution. Where the coating material is zinc, the coating may be removed by reacting with an acid in the leach solution. As described above, the presently disclosed method may use a leach solution containing sulfuric acid to aid in dissolving the zinc coating material.

In one particular embodiment, a coated metal (for example, galvanized steel) can be decoated using the described process.

As described above, the concentrations of free acid and dissolved coating material in the leach solution are maintained at or near a steady state. Because free acid is being consumed and coating material is entering the leach solution during the decoating process, free acid is added to the reaction vessel and dissolved coating material is removed from the reaction vessel throughout the decoating process. This is accomplished using a method referred to as "feed and bleed."

In feed and bleed, dissolved coating material is removed from the reaction vessel during the decoating process by removing a volume of the leach solution that contains the dissolved coating material, and a similar volume of free acid containing solution is added to the reaction vessel. The free acid added to the reaction vessel may be included in a reconstituted leach solution or may be added separately. Reconstituted leach solution comprises a strip solution that has undergone diffusion dialysis against the removed leach solution. In most embodiments, this dialysis allows free acid ions and hydrogen ions to enter the strip solution stream. While some amount of dissolved coating material may also be extracted from the leach solution into the strip solution, its concentration is significantly below that of the removed leach solution.

Free acid may also be added to the reconstituted leach solution prior to the reconstituted leach solution being added to the reaction vessel tank. In some embodiments, a volume of free acid may be added directly to the reaction vessel tank. Addition of free acid helps maintain the free acid concentration and the volume of leach solution in the tank, thus maintaining the free acid at a steady state concentration. Volumes of each stream can be adjusted to various flows and ratios.

The progress of the decoating process is monitored using a corrosion potential. The corrosion potential is a voltage formed between an anode (coating material and substrate metal) and a cathode (evolved hydrogen in the leach solution). The corrosion potential is defined using mixed potential theory as being the point where the anodic and cathodic currents have a net difference of zero, meaning the rate of metal oxidation is equal to the rate of hydrogen reduction. Corrosion potential can be measured by completing an electrical connection between a working electrode, the coated metal, and a reference electrode immersed in the leaching solution. In the present case, the leach solution acts as an electrolyte, and a voltage through this circuit is measured with a voltmeter Where scrap zinc-coated metal is decoated using an acid leach solution, the progress of decoating is measured directly. This is accomplished because the working electrode, the scrap metal, is in direct electrical contact with the scrap containment cage, which is at least partly made of a conductive material. Thus, one end of an electrical lead may be attached directly to the cage and the other to a volt meter.

The disclosed method determines an average corrosion potential because a plurality of scrap metal pieces, which act as working electrodes, are in electrical communication with the containment cage. That is, the volt meter measures the electrical potential of all scrap in electrical communication with conductive portions of the cage. This averaging of the corrosion potential provides a more accurate indication of the progress of the decoating process for the amount of scrap positioned within the containment cage.

In many cases, the voltage formed between the reference electrode and the working electrode is measured on a high impedance voltmeter. As the coating material is dissolved and the metal substrate is exposed, the corrosion potential shifts from a coated potential to an uncoated potential, and then plateaus when the de-coating process is at or near completion. Because the progress of coating dissolution is related to the shift in corrosion potential, it is possible to monitor the progress of coating dissolution (decoating) by monitoring the decoating system's corrosion potential. In some embodiments, the process can be automated such that when the corrosion potential plateaus, or achieves a pre-set value the decoating process is stopped by removing the scrap from the leach solution/electrolyte. This minimizes dissolution of impurities.

Voltage produced by the circuit described above may vary, depending on the substrate metal, coating material, and leach solution used.

In the case of zinc-coated steel, the difference in voltage measured between the zinc-coated steel and uncoated steel is about 0.5 volts or from about 400 mV to about 600 mV. For example, when a standard hydrogen electrode is used, the voltage produced by coated metal may be about −700 mV and the voltage produced by the de-coated metal may be about −250 mV (i.e. −700 my−−250 mV=−450 mV). In the case of an Ag/AgCl reference electrode the voltage produced by coated metal may be about −1.0 V and the voltage produced by the de-coated metal may be about −0.6 V.

Organic compounds may be found in the leach solution. In some cases, organic compounds can be used to aid in controlling corrosion. These compounds may enter the leach solution either through entrainment on the metal, or through controlled addition. For example, oils may be added to the process because it is known that they provide a corrosion inhibiting effect for the coating and/or the metal substrate.

Organic compounds in the leach solution are maintained at a desired steady concentration. In many cases this is accomplished by removing the organic compounds using a constant bleed stream. For example, organic compounds can concentrate on the surface of the leach solution to form a coating on available solid surfaces. In some cases, available solid surfaces include the reaction vessel wall, in other cases, an available solid surface may be the polypropylene structure added to the reaction vessel for the purpose of collecting organic compounds. In one preferred example, a plurality of balls or beads may be added to the reaction vessel and a portion of the balls or bead removed from the reactor vessel, washed in an organic solvent, and returned to the reactor vessel at a rate to maintain the steady state concentration. In other cases, raft devices which float on the leach solution surface may be used to aid in removal of the organic compounds. Buoyant balls, beads, or rafts may also aid in controlling formation of acid aerosols. Acid aerosols may be formed through hydrogen gas evolution from the leach solution's surface. In some embodiments, hydrogen gas may be recovered from the reaction vessel and reused or collected as a product for use as energy or chemical purposes.

Activated carbon of charcoal or another ion exchange media may be used to remove organics in the solution.

As described above, the scrap coated-metal can be introduced into the leach solution using a corrosion-resistant cage, or added to a containment cage that is already immersed in the leach solution. The containment cage is constructed of a corrosion-resistant material to aid in reducing contaminants from the cage material entering the leach solution. The cage is also a porous container, such as a mesh or screen that allows leach solution to enter an interior of the cage, where scrap coated metal is placed.

Passage of the cage through the leach solution helps to establish a mixing in the solution. This mixing aids in disturbing surface boundary layer phenomena which may occur. These phenomena may limit the amount of required chemical that can reach the surface reacting on the coating. The mixing of the leach solution aids in providing a substantially homogeneous leach solution.

In some embodiments, the velocity field can be established by movement of the cage, for example a cage may be rotated. In some cases, the cage is placed on a rotating wheel, or the cage itself is rotated. In some embodiments, the cage may define a cylinder and the cylindrical cage may be rotated on an axis. Movement of the cage may aid in moving the scrap coated metal. For example, movement of the cage may cause a bed of scrap to tumble so that several surfaces of each piece of scrap may be exposed to the leach solution. In most cased the cage is constructed of a material having a low hydrogen reduction overpotential, such as 316 stainless steel. Thus, because the zinc coating dissolution is cathodically controlled, dissolution of the zinc coating is faster than dissolution of the cage material.

The decoating process may be run as a batch or continuous process. When the disclosed process is performed in batch mode, an amount of coated scrap metal may be placed in the containment cage and then the cage is removed when the decoating process is completed. In continuous mode, the system will comprise a plurality of reference/working electrode circuits to monitor the progress of each stage of decoating. In continuous mode, a screw, wheel, spiral, conveyer, or similar device may be used to add and remove scrap from the reaction vessel.

Reagent Recovery

Removed leach solution (bleed) can be treated after it is removed from the reaction vessel. In many embodiments the total amount of volume removed from the reaction vessel as removed leach solution is between about 40-100 L per metric tonne (1000 kilograms) of scrap coated metal.

Removed leach solution can be treated using various methods. For example, the removed leach solution can be treated in a dialysis unit where one or more molecules or compounds can be extracted from the removed leach solution. In one embodiment, free acid can be recovered out of the removed leach solution after it is removed from the reaction vessel. In most cases, the free acid can be extracted from this solution and recycled into the reaction vessel.

Ion exchange resins can also be used to selectively recover acid in a non-continuous process.

Figure 15:
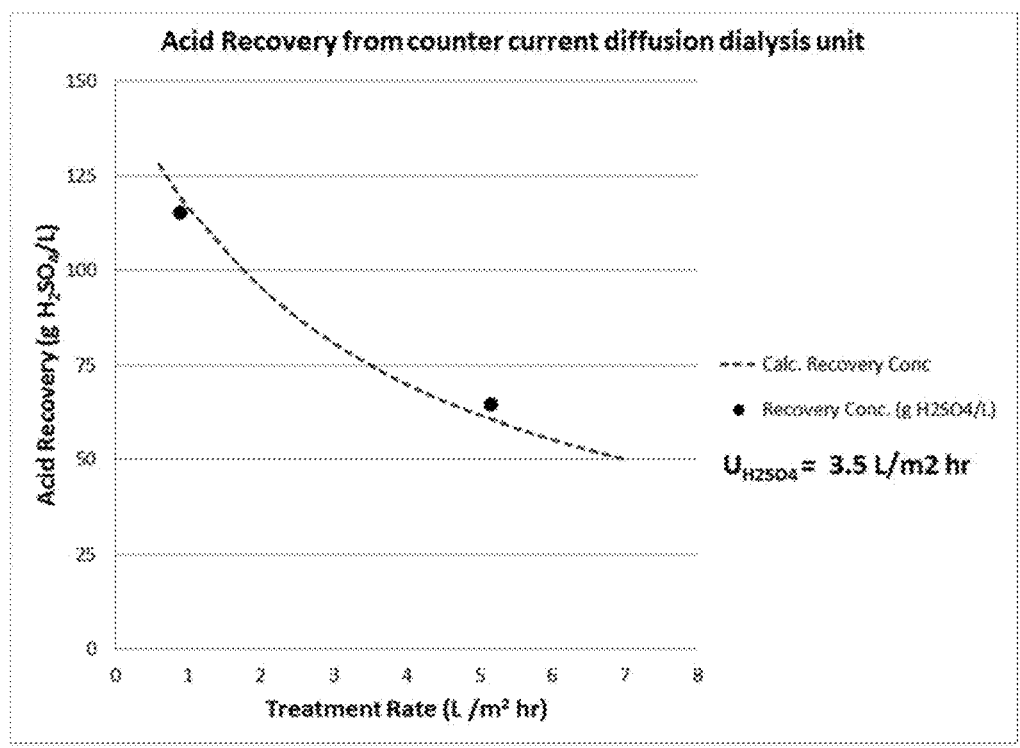
FIG. 15 is a graph showing actual and calculated acid recoveries using the bench scale leach solution as a function of the treatment rate for the Bench Scale MechChem DD unit using AFN anionic membrane.

Free acid is extracted from the removed leach solution by dialysis. Specifically, the removed leach solution can be dialyzed against a strip solution using suitable membranes, for example a dialysis membrane, as depicted in FIG. 15 and described below. In some embodiments, the membranes may comprise compounds, for example ionic compounds. These ionic compounds may aid in attracting charged ions in the removed leach solution and repelling other ions. In most cases, the dialysis membrane can also exclude ions, molecules, and/or compounds of specific sizes. In embodiments where zinc is stripped from steel using sulfuric acid, the dialysis membrane may include cationic compounds which aid in selectively removing free acid anions from the removed leach solution, while blocking the passage of Zn through the membrane. In some cases, cationic compounds can be impregnated in a resin.

The free acid ions are transferred to the low ionic strength strip solution. In many embodiments, the strip solution can be de-ionized water. In other embodiments, the strip solution can be obtained from one or more aqueous solutions produced during processing, for example during a reagent recovery method described below. Other suitable strip solutions may include distilled water, scrap wash water from after the leach, municipal water supplies.

The use of membranes impregnated with cationic compounds to recover anionic species from a bleed solution to a strip solution utilizing concentration gradients may be referred to as diffusion dialysis. Diffusion dialysis can be used to recover free acid through use of a concentration gradient of the target species. Here, diffusion dialysis is used to aid in recovery of sulfate ions. For example, as sulfate is transferred from a high concentration sulfate solution (the removed leach solution) to a lower concentration strip solution, hydrogen and/or hydronium cations ($H_3O^+$) are also transferred across the membrane, which helps to maintain electroneutrality. Zinc ions have much lower diffusivity and are selectively kept in the bleed.

After treatment in the reagent recovery unit, the strip solution gains free acid and can then be returned to the reaction vessel as reconstituted leach solution. In some embodiments, a concentrated acid can be added to the reconstituted leach solution to help maintain the free acid concentration in the reaction vessel. In some embodiments, it may be desirable to filter the recovered leach solution prior to the recovered leach solution entering the dialysis unit.

Solution Purification

Molecules and compounds can be extracted from the removed leach solution through various methods. This extraction can be performed before or after the removed leach solution is treated by other methods, such as dialysis. In some embodiments, purification of the removed leach solution can occur through cementation. Cementation is galvanic reduction using a less noble metal to aid in precipitating out a molecule or compound. In many cases, cementation is used to remove one or more impurities in a solution. Here, zinc dust can be used to cement out metals in the removed leach solution such as copper, lead, and cadmium.

In some embodiments, the removed leach solution can be extracted, for example by solvent extraction. In these embodiments, solvent extraction can be used to help obtain a substantially pure solution of zinc sulfate. This can be accomplished by mixing the removed leach solution with an organic solvent, for example an organic solvent containing cationic extractants. In some embodiments the organic solvent can be kerosene and the extractant can be D2HEPA. Solvent extraction is liquid-liquid ion exchange. Ion exchange using resins can also be used to purify the solution.

In some embodiments, iron is selectively purified from the removed leach solution. For example, iron can be selectively removed from the removed leach solution using precipitation, such as with a ferric solid compound. Iron can also be removed from solution via crystallization as an iron sulfate product.

Product Recovery

Dissolved coating material can be recovered from the removed leach solution in various ways. In some embodiments, coating material can be recovered from the removed leach solution through cooling, crystallization, evaporation, or a combination thereof. In various embodiments, waste heat from a foundry may be redirected to aid in recovery of various products. In some embodiments, hydrogen gas evolved during dissolution of the coating material may be used to help recover product.

In the case of decoating galvanized metals with sulfur containing acids, zinc sulfate hydrate compounds can be recovered from the solution by cooling crystallization, evaporative crystallization, drying which can produce a crystalline product or a granulated product. Other zinc compounds can be equally formed, dependent on the solutions matrix. Metallic zinc can be recovered via electrowinning to produce a cathode product.

Granulated coating material product can be formed through various processes. In one embodiment, accretion is used to produce a granulated coating material product. In the case of acid treated galvanized metal, a granulated zinc sulfate may be formed that has a relatively uniform spheroid structure. Granulated products can also be obtained by methods involving a fluidized bed reactor, a spray drier, or other comparable technologies. For example, granulated zinc sulfate product can be formed in a disk pelletizer, rotating granulator, fluidized bed reactor, spray dry reactor or comparable granulation technology.

In some embodiments, coating material or other compounds/molecules may be recovered by crystallization. For example, fractional crystallization can be used to obtain selectively in crystal product composition/purity.

Hydrogen gas can be recovered from the reaction vessel as it is evolved during dissolution. In some cases, the reaction vessel may be configured to capture the gas. The hydrogen gas can be collected for later sale, or can be recycled in the process as a chemical reductant or burned for energy.

Product Uses

The disclosed processes result in various product streams. For example, the disclosed process may result in compounds comprising coating material in liquid or solid form. The substrate metal, substantially free of coating material, is also produced. These two product streams may be sold to various industries. For example, in the case of zinc-coated galvanized steel, steel with the zinc layer removed can be used as a substitute for the industry standard steel scrap. For example, a ferrous product that has been decoated can be used as a feed material to steel foundries. The disclosed process may also be used to produce a zinc cathode or other zinc compound from decoating a zinc coated material. In some cases, dezincing may produce zinc carbonate or zinc oxide.

In one embodiment, the disclosed processes may be used to produce nutrient supplements. For example, zinc may be used as a micro-nutrient for plants or animals, such as zinc sulfate heptahydrate or monohydrate or oxysulfate or oxide for use as a dietary supplement. In most embodiments, the disclosed process can be used to produce a zinc containing product wherein impurity concentrations are below levels that are permissible under U.S. Environmental Protection Agency (EPA) regulations, as shown below. Table 1 shows the maximum allowable impurities relative to the zinc concentration in the micro-nutrient product produced by a zinc bearing hazardous waste material. For example, every 1 wt % of zinc, a maximum of 1.4 ppm Cadmium is allowed. Therefore if a pure zinc sulfate monohydrate is formed which contains 35.5 wt % zinc, 35*1.4=49.7 ppm maximum of cadmium is allowed in the product.

TABLE 1

| Constituent | Unit: | Max. Total Conc. Per 1 wt % Zn | Zinc Sulfate Monohydrate | Zinc Sulfate Heptahydrate |
|---|---|---|---|---|
| Zn | Wt % | 1 | 35.5 | 21.5 |
| Zn | ppm | 10,000 | 355,000 | 215,000 |
| Arsenic | ppm | 0.3 | 10.7 | 6.5 |
| Cadmium | ppm | 1.4 | 49.7 | 30.1 |
| Chromium | ppm | 0.6 | 21.3 | 12.9 |
| Lead | ppm | 2.8 | 93.4 | 60.2 |
| Mecury | ppm | 0.3 | 10.7 | 6.5 |

The coated material may have another classification making a zinc sulfate fertilizer produced from it applicable to other standards.

Figure 9:
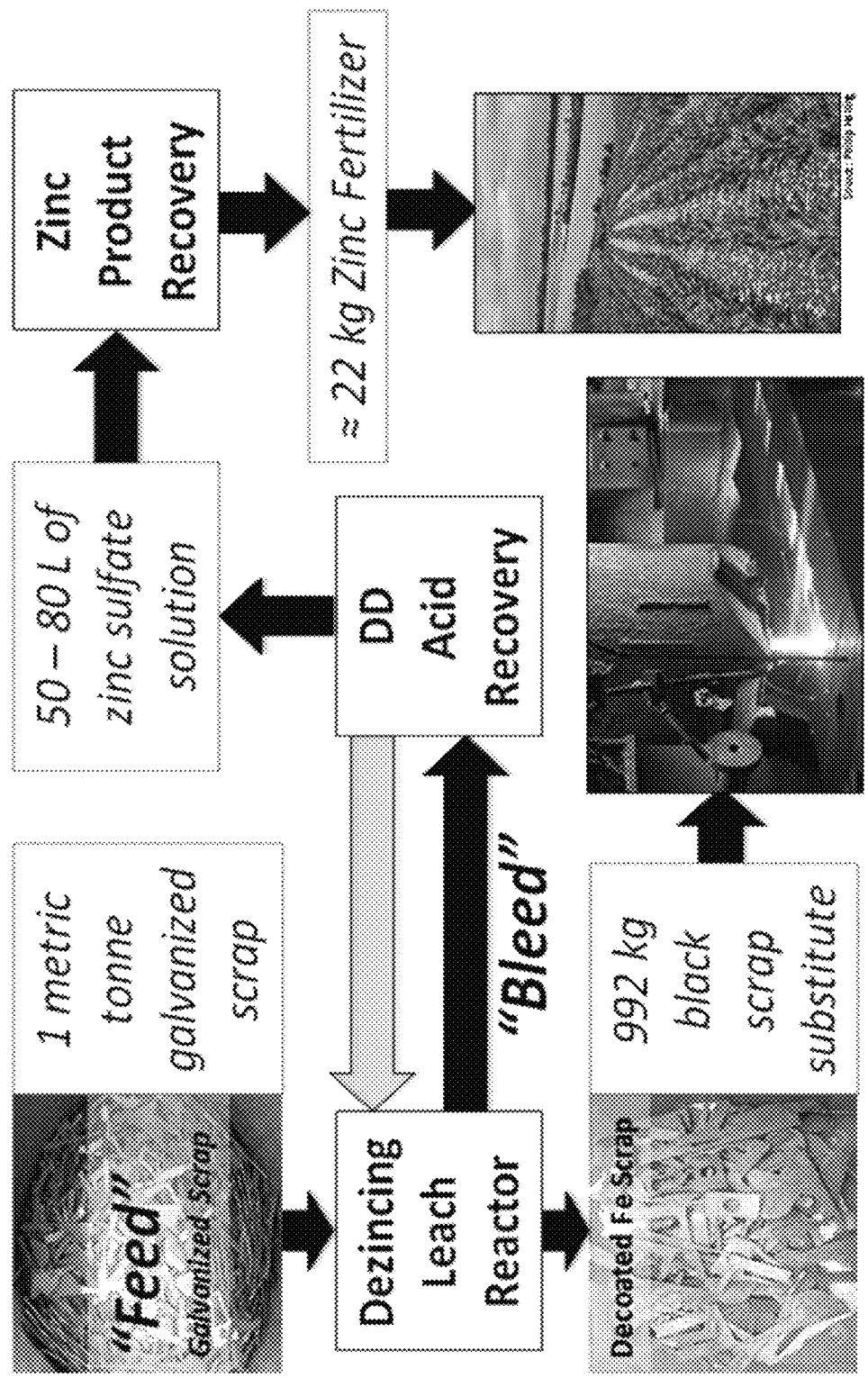
FIG. 9 is a flow diagram showing one embodiment of the disclosed method used to treat one metric tonne of galvanized scrap to produce a zinc-containing fertilizer and black, decoated scrap.

FIG. 9 is a flow diagram showing one embodiment of the disclosed method used to treat one metric tonne of galvanized scrap to produce a zinc-containing fertilizer and black, decoated scrap.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

EXAMPLES

Figure 3:
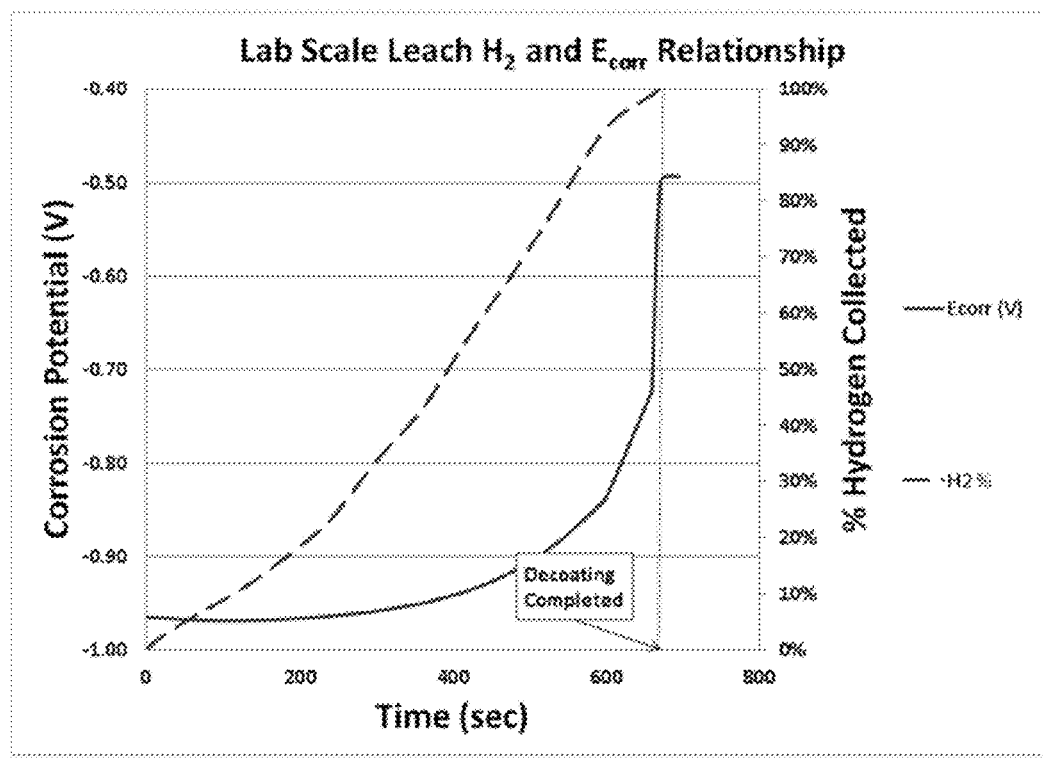
FIG. 3 is a graph showing corrosion potential and % completion as a function of time.

Example 1—FIG. 3 (15% $H_2SO_4$ with Various [Zn])

The corrosion potential is monitored by making an electrical connection to the working electrode (which in this case is comprised of the zinc coated scrap) and hooking it in series to a voltmeter. When the corrosion potential plateaus it indicates completion of the zinc coating removal and an optimum residence time for the scrap in the electrolyte. Simultaneous to the electrochemical measurements, the rate of zinc dissolution has been monitored through the H2 evolution from the leaching process.

FIG. 3 shows Corrosion potential and % completion of deleaching plotted against time.

Judging from visual observations and FIG. 3, corrosion potential offers better resolution for determining the completion of coating removal, and hence when the scrap should be withdrawn from the leach solution electrolyte.

As depicted in FIG. 3, the rate of zinc decoating follows generally an 'S' curve, which may be explained by the appearance of the steel substrate surface, and the disappearance of the zinc coating. Zinc has a higher hydrogen overpotential than steel. Therefore as steel is exposed, the rate of hydrogen reduction increases. This also explains the change in corrosion potential as the system shifts from a predominant Zn anodic half reaction to a Fe half reaction. It is proposed that the cathodic process of hydrogen reduction on the substrate surface be it zinc or steel, is the controlling step of the leaching process.

Figure 4:
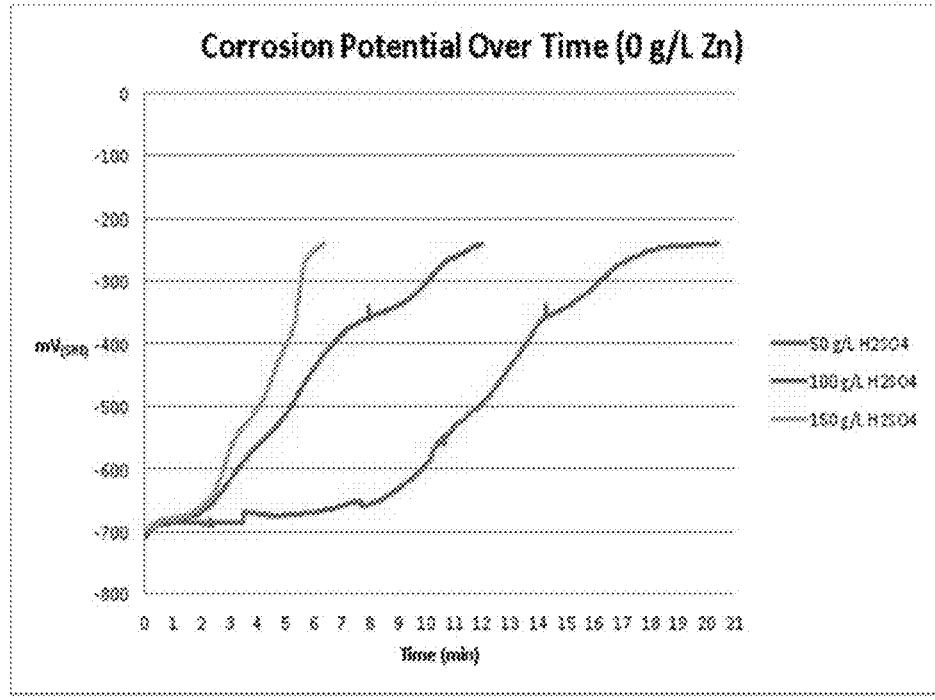
FIG. 4 is a graph showing corrosion as a function of time in various concentrations of zinc at the same concentration of $H_2SO_4$.

Examples 2 and 3—FIGS. 4 (5-15% $H_2SO_4$) and 5

Figure 5:
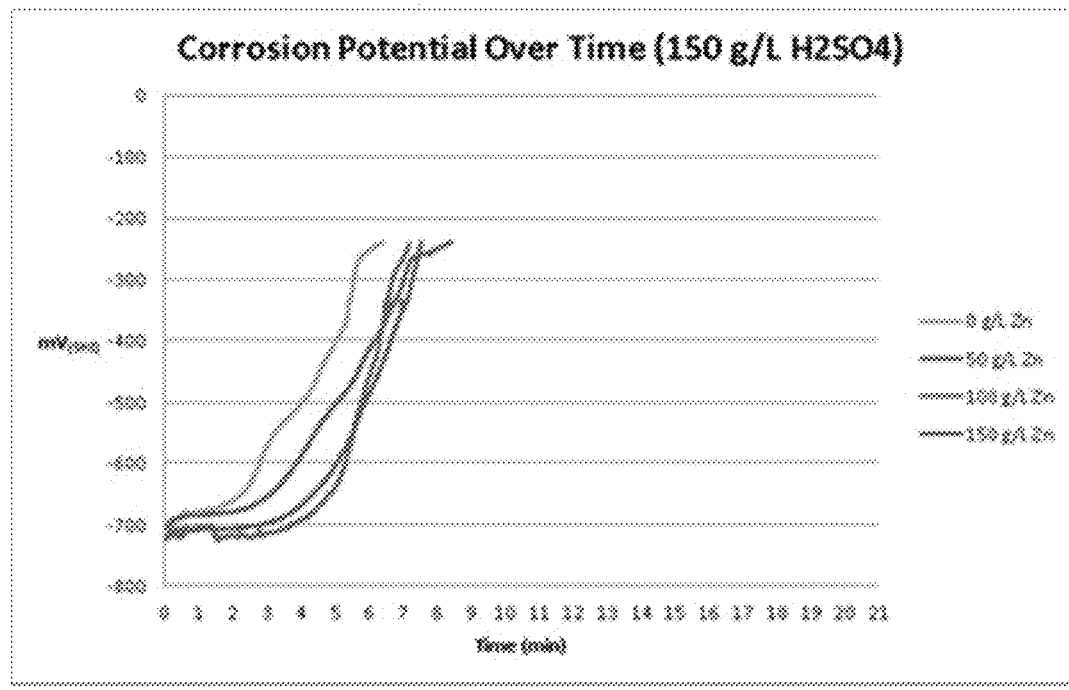
FIG. 5 is a graph showing corrosion as a function of time in at various $H_2SO_4$ percentages.

Experiments were conducted to examine the effect of H2SO4 concentration (FIG. 4) and zinc concentration (FIG. 5). Varying the zinc concentration in the leach solution had little effect on the leaching rate of the zinc coating. However, similar experiments showed that increasing the acid concentration reduces the scrap residence time greatly (FIG. 4). Zinc concentrations were experimented with to 150 g Zn/L, but saturation effects started being seen in salt rims on the glassware.

Example 4—Corrosion Potential Bench-Scale Experiments

A bench scale leach reactor has been constructed to conduct experiments. The reactor has a capacity of 15 L of leach solution and is capable of leaching 5 kg loads of scrap. The scrap load is contained in a steel cage with pulses through the solution providing bed movement.

Bench Scale operating parameters were chosen with consideration for a variety of factors. For example, initial tests indicated that acid concentration and temperature are factors contributing to the rate of decoating. However, in order to minimize the cost of performing bench scale tests, an ambient leach temperature (20° C.) was chosen. Additionally, in order to maximize leach capacity a high free acid concentration of 150 g H2SO4/L was chosen to avoid reactor material restrictions. A steady state zinc concentration of 100 g Zn/L was also chosen to reduce solution volume and avoid issues associated with saturation.

Figure 6:
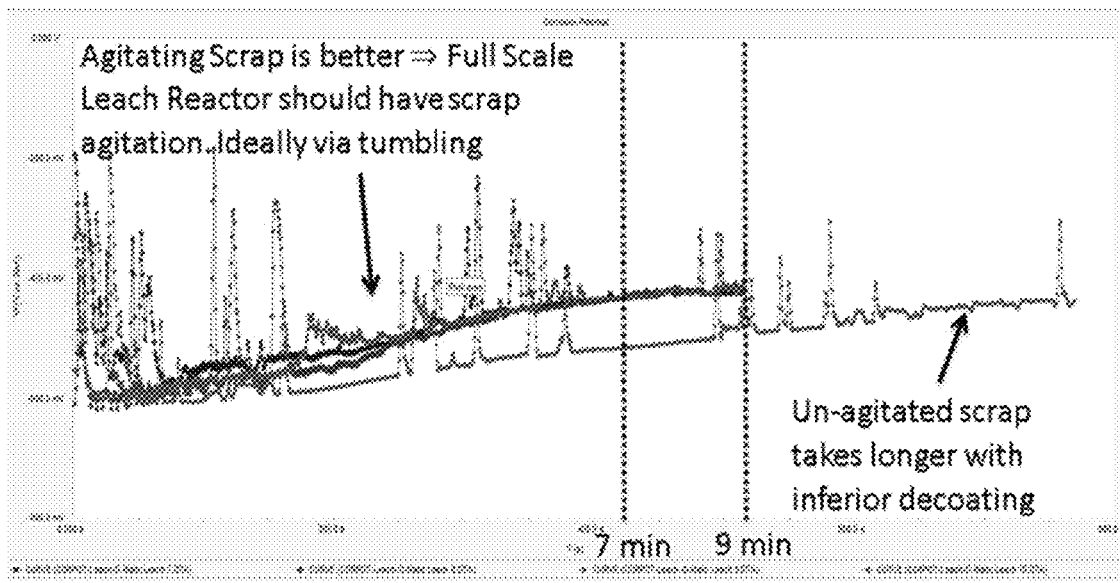
FIG. 6 depicts corrosion potential for 4 bench scale leaches (3 with agitation, one without agitation). The corrosion potential on the y-axis is relative to the Ag/AgCl reference electrode (Eh+200 mV).

The corrosion potential was monitored for each individual leach experiment. 4 leaches are shown in FIG. 6. Leaches 7-9 (blue, red, purple lines, which end at 9 min) had the same operating parameters and match each other very well, whereas leach 10 (green line extending beyond 9 min) had no agitation resulting in the longer time to plateau.

The effect of agitation may aid in exposing fresh surfaces to the leach solution. Without agitation, some surfaces may be blocked from exposure to the leach solution by proximity to other surfaces. In some cases, symmetrical, nearly identical areas of zinc coating remained on some pieces of otherwise dezinced flat scrap, which suggested that blocking was occurring on adjacent pieces of scrap. This blocking effect may be greater when scraps have a flat or even geometry which allows for tight packing.

The Free acid concentration was maintained at a steady state of 150 g $H_2SO_4$/L±5 g $H_2SO_4$/L. Acid consumption for each leach was stoichiometrically calculated to be 60 g of 96% $H_2SO_4$ (later experiments have increased this to 80 g to maintain free acid concentration). ORP hovers around an Eh value of 0 mV as it is thought that the predominant redox couple controlling this potential is $H^+/H_{2(aq)}$.

Figure 7:
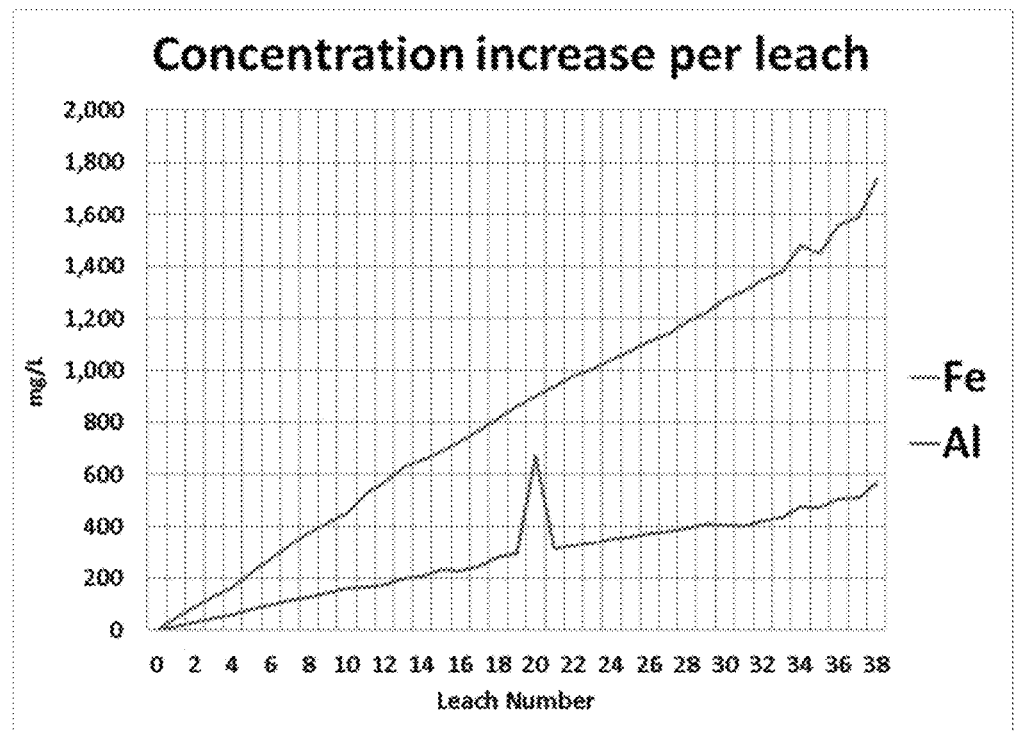
FIG. 7 is a graph of the solution concentration for iron and aluminum per leach.
Figure 8:
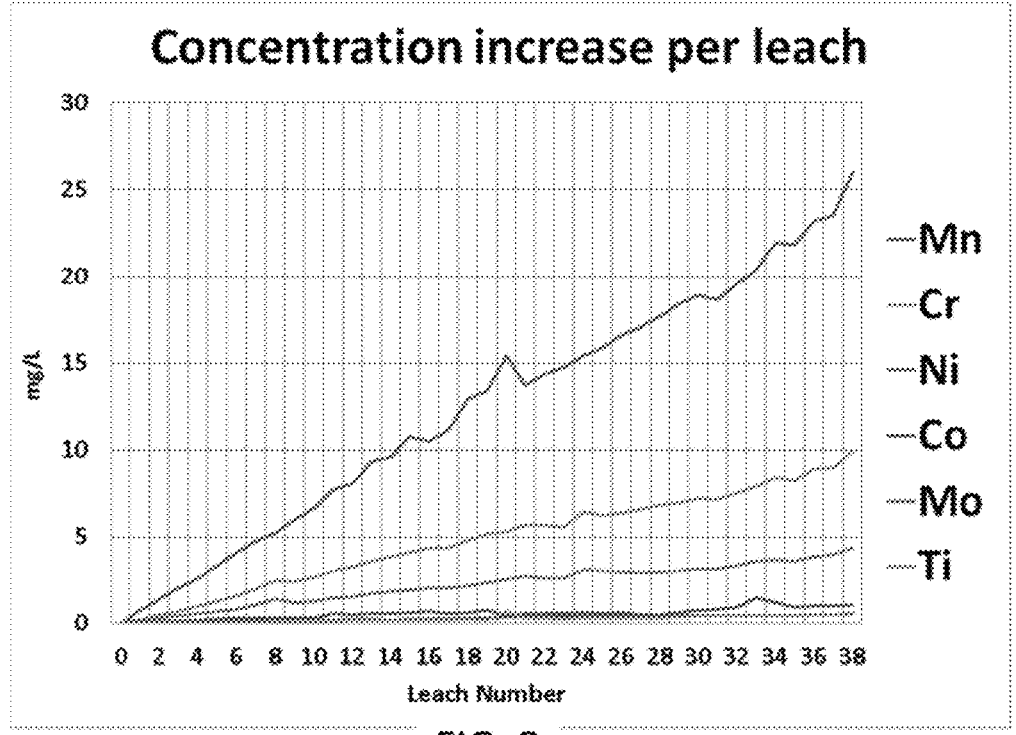
FIG. 8 is a graph of the solution concentration for cobalt, chromium, nickel, manganese, manganese, molybdenum, and titanium per leach.

After 38 leaches the bench scale solution concentration was approximately 100 g Zn/L. FIGS. 7 and 8 show an increase in impurities in the leach solution up to a steady state concentration. Iron and aluminum were the main impurities present and may be explained by leaching of the iron substrate and the alloyed aluminum in galvanized coatings. Other impurities may come from the galvanized scrap, but since this is a low carbon scrap with nominal alloying metals (Cr=0.03 wt. % & Ni=0.009 wt. %) it is believed that these impurities may be leaching from the 316 stainless steel basket rather than or in addition to the scrap.

Other metals such as Calcium, Magnesium, and Sodium were present in the 10's ppm range. Arsenic, Boron, Barium, Beryllium, Cadmium, Thallium, Vanadium and Antimony were below detection levels.

De-zinced scrap was left in a tray to air dry after each leach. Without additional washing, the scrap has a white powdered residue. Washing the de-zinced scrap removed the white powdered residue, and the washed, de-zinced scrap developed a coating of iron corrosion. The white powder is believed to be predominantly zinc sulfate.

Figure 11:
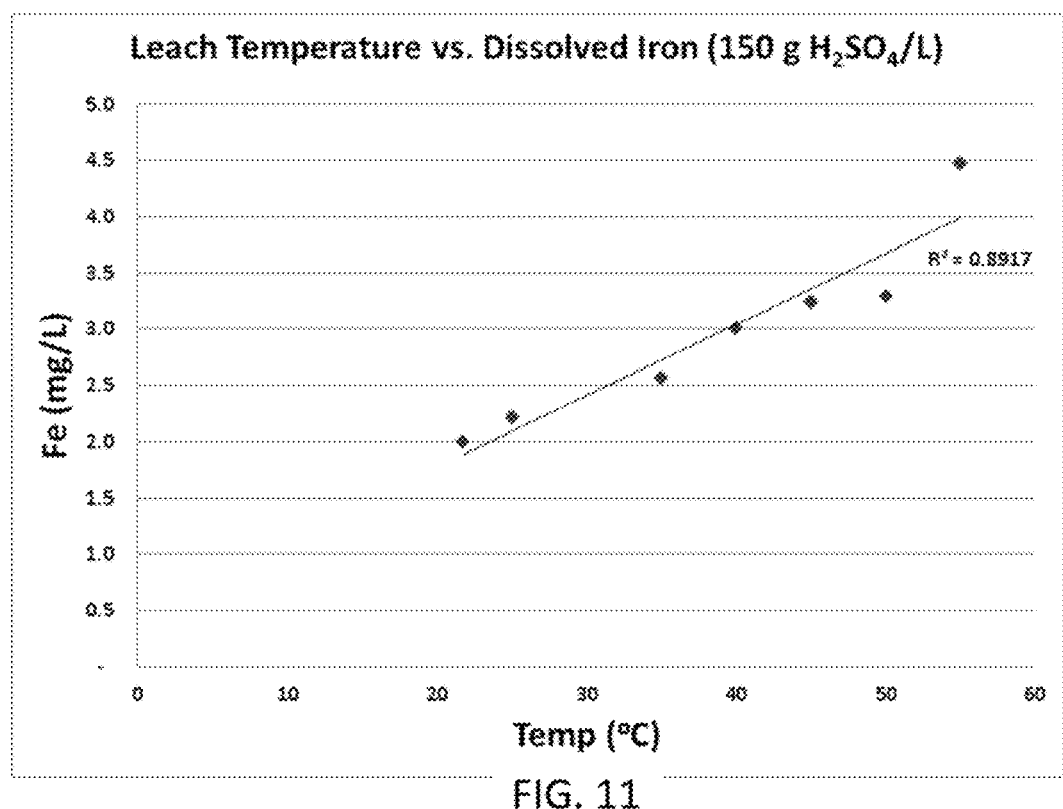
FIG. 11 is a graph showing the effect of leaching temperature on iron dissolution.

Example 5—FIG. 11 Minimization of Iron Dissolution from the Substrate Steel

Using a smaller scale setup at approximately 1/100th the scale of Example 3, iron dissolution has been minimized by keeping the decoating reaction at ambient temperature. As shown in FIG. 11, an increase in temperature is associated with increased iron dissolution.

The corrosion potential has been used to minimize the dissolution of the substrate iron by separating the metal from the electrolyte solution upon completion of the decoating reaction. The level of iron dissolving using the Teflon coated basket run follows the same trend as the stainless steel basket. This would indicate that iron dissolution is chiefly coming from the scrap and not the reactor.

Figure 12:
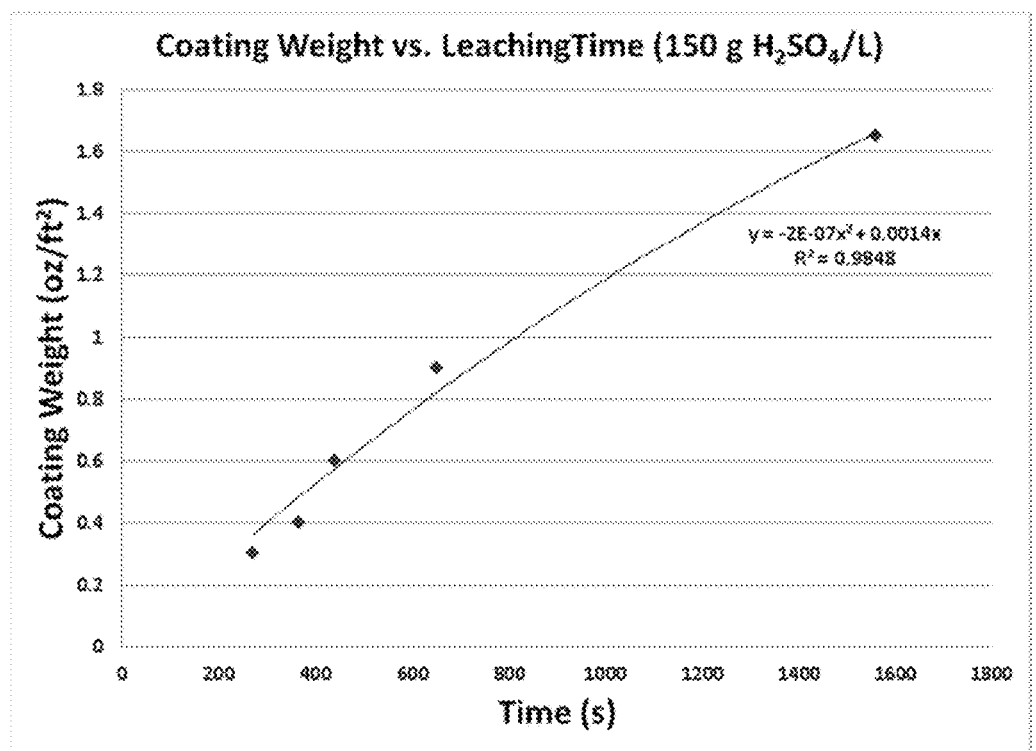
FIG. 12 is a graph showing the effect of zinc coating weight on total leaching time.

Example 6—FIG. 12 Adjustment to Decoating Time Dependent on Coating Weight/Thickness Using a smaller scale setup at approximately 1/100th the scale of Example 3, the decoating time increases with increasing coating weigh/thickness. As shown in FIG. 12, the decoating time is adjusted accordingly via monitoring of the corrosion potential to ensure the decoating reaction has reached completion.

Figure 13:
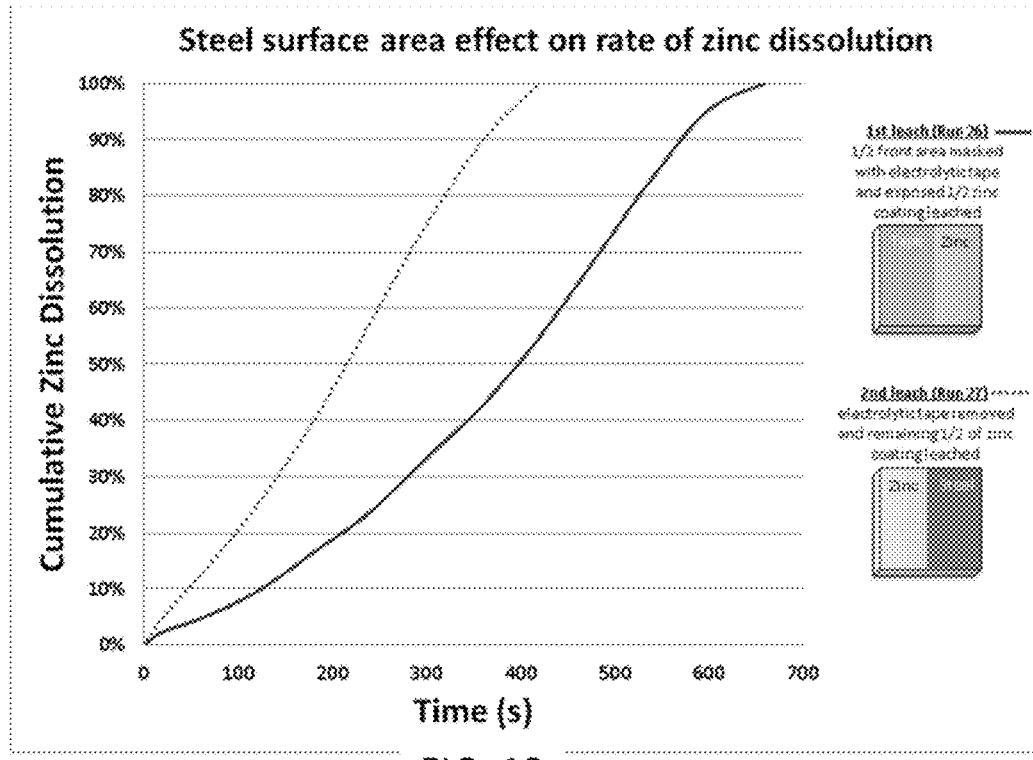
FIG. 13 is a graph showing the leaching times of half-coupon surface leaching without and with exposed steel surface.

Example 7—FIG. 13 Increasing the Decoating Rate by Exposing Substrate Surface to the Electrolyte The exposure of the substrate beneath the coating to the electrolyte increases the decoating rate. These experiments, shown in FIG. 13, are galvanic coupling experiments. Experiments involved corrosion coupons with a coating thickness of G90, being leached twice in in 150 g $H_2SO_4$/L acid solution at 20° C. FIG. 13 shows the effect of exposed steel surface on the leaching rate of the zinc coating. The zinc coatings are of identical size and have a near equal mass loss after leaching. Half of the surface of the coupon is isolated from the acid solution by masking its surface with electrolytic tape. The second leach proceeded at a faster rate than the first. Galvanic coupling, or galvanic corrosion, is the term given to accelerated corrosion of the more electroactive metal when two dissimilar metals are in electrical contact. This is the case for galvanized steel, and in fact is the method in which the substrate steel is protected. Another facet of the zinc-steel system is the large difference in exchange current densities between steel and zinc. This represents the intrinsic electron transfer rate between the electrolyte and is governed by the metals work function, free energies of adsorbed hydrogen bond formations, reactant surface potentials and solvent (water) dipoles adsorption characteristics.

In FIG. 13 it is shown that masking the coated metal and half of the coating in two separate leaches one after another, with the masking tape removed for the second leach, that by exposing the iron surface to the electrolyte in the second leach the rate of decoating is increased. There is an effect of iron adjacency to the zinc, with greater iron-zinc coating adjacency leading to greater decoating rates. Where the substrate has a lower hydrogen overpotential allowing for a faster decoating reaction to occur. Where the substrate has a lower work function allowing for a faster hydrogen reduction reaction to occur. Where the increased rate of the hydrogen reduction allows for an overall increased decoating rate.

Figure 14A:
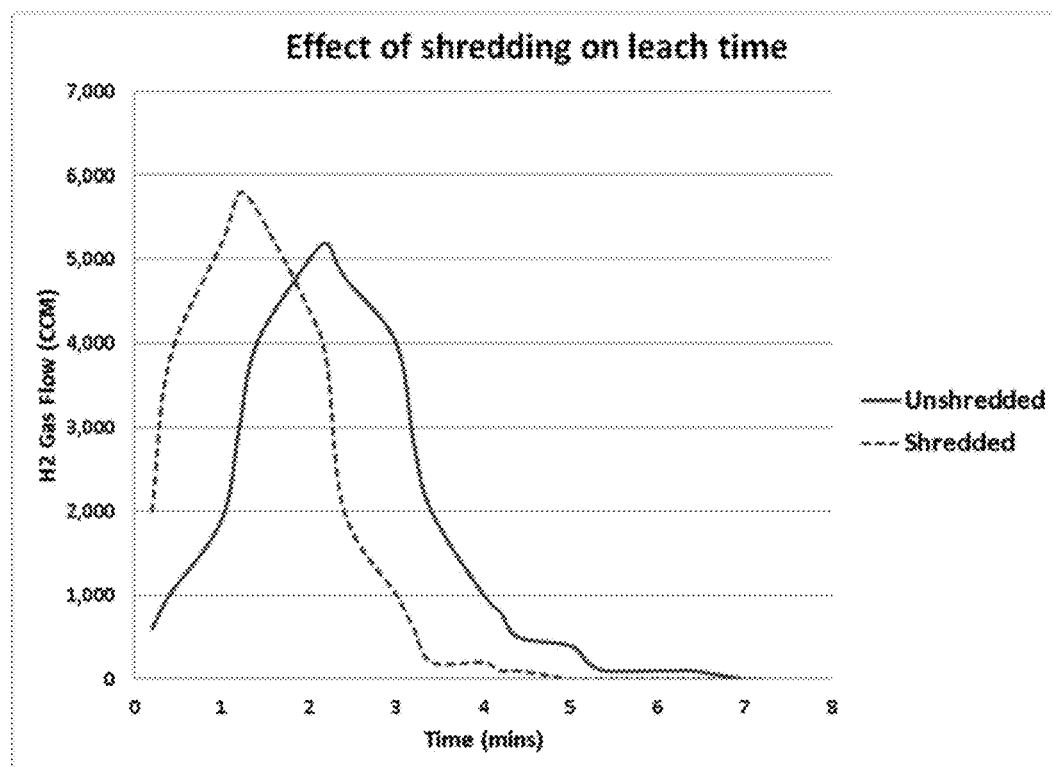
FIG. 14A-B are graphs comparing hydrogen evolution rates for experiments using shredded scrap (FIG. 14A) and in FIG. 14B the Teflon basket and the original stainless steel basket.
Figure 14B:
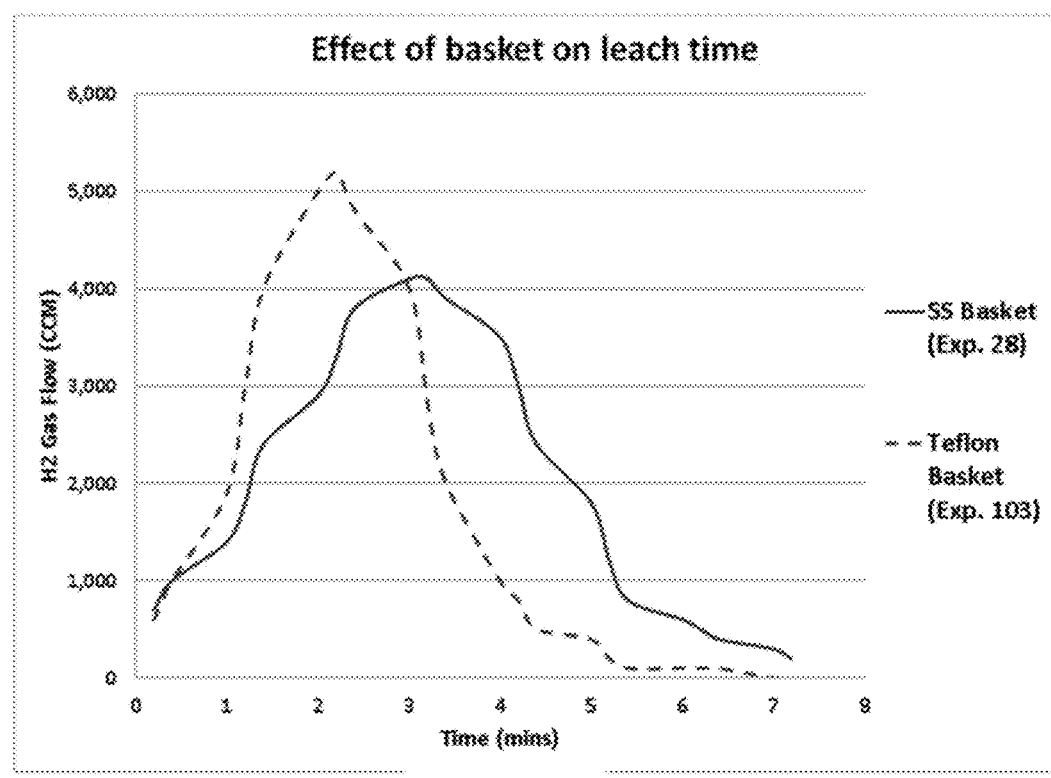

Example 8—FIGS. 14A and 14B Mechanism for Exposing Substrate Surface to the Electrolyte by Shredding and Use of Coated Basket By shredding coated metal it is possible to increase the overall exposed iron substrate surface and iron-zinc coating adjacency. As shown in FIG. 14A, the increase substrate surface that is exposed to the electrolyte results in an increased decoating rate. Shredding produces scrap of various size: Particle Size (Inches), Weight (Kg), Percent (%): −7/8"+1/2", 5601.1 Kg, 54.3&; −1/2"+3/8", 3142.6 Kg, 30.5%; and −3/8" 1570.1 Kg, 15.2%. The leach was conducted on the −1/2"+3/8" size fraction. The shredding deforms the galvanized surface coating and exposes much more steel to the leach solution. The electrokinetic effect of this increased iron surface area is to allow increased hydrogen evolution.

FIG. 14B shows the effect of using a coated basket. These experiments led to the unexpected finding that the dezincing reaction rate in a coated basket is higher than in an uncoated basket. Here the uncoated basket is comprised of stainless steel and the coating is a TEFLON coating of EFTE.

Example 9—FIG. 15 Recovery of Acid from the Leach Solution

The leach solution is passed across AFN anionic membranes using diffusion dialysis. This recovers a high zinc sulfate—low acid solution to progress to zinc product recovery, and a high zinc sulfate—low acid solution to return to the decoating leach.

All references disclosed herein, whether patent or nonpatent, are hereby incorporated by reference as if each was included at its citation, in its entirety.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

We claim:

1. A method for decoating coated metals comprising:
   placing a scrap metal with a coating layer in a containment cage;
   immersing the coated scrap in an acidic leach solution in a reaction vessel;
   reacting the coating layer with the leach solution to dissolve the coating layer into the leach solution;
   placing a reference electrode in the leach solution;
   measuring a corrosion potential by connecting at least one coated scrap to a volt meter and the reference electrode to the volt meter;
   removing a volume of leach solution from the reaction vessel containing dissolved coating material;
   dialyzing the volume of leach solution removed from the reaction vessel against a low ionic strength strip solution;
   allowing an acid from the leach solution to enter the strip solution to create an acidified strip solution;
   adding a volume of the acidified strip solution to the reaction vessel;
   stopping the reacting of the coating layer with the leach solution when the measured corrosion potential reaches a plateau; thereby
   decoating a coated metal.

2. The method of claim 1, wherein the coating is zinc.

3. The method of claim 2, wherein the metal is steel.

4. The method of claim 3, wherein the acid is sulfuric acid.

5. The method of claim 1, wherein the coated scrap is shredded to create coated scrap pieces an average dimension of less than about one-half inch.

6. The method of claim 1, wherein the cage is electrically conductive.

7. The method of claim 1, wherein the cage is comprised of a coated metal, and a working electrode is contained within the cage in contact with at least one coated scrap.

8. The method of claim 7, wherein the cage is comprised of a metal coated with a fluorine based plastic.

9. The method of claim 8, wherein the fluorine based plastic is ethylene tetrafluoroethylene, ETFE.

* * * * *